United States Patent
Martinotti et al.

(10) Patent No.: US 9,838,217 B2
(45) Date of Patent: Dec. 5, 2017

(54) ENCAPSULATING CPRI FRAMES

(75) Inventors: Riccardo Martinotti, Busto Arsizio (IT); Giulio Bottari, Livorno (IT); Diego Caviglia, Vallingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1 day.

(21) Appl. No.: 14/408,794

(22) PCT Filed: Jul. 23, 2012

(86) PCT No.: PCT/EP2012/064408
§ 371 (c)(1),
(2), (4) Date: Mar. 27, 2015

(87) PCT Pub. No.: WO2013/189553
PCT Pub. Date: Dec. 27, 2013

(65) Prior Publication Data
US 2015/0249549 A1    Sep. 3, 2015

(30) Foreign Application Priority Data
Jun. 20, 2012 (EP) .................................. 12172751

(51) Int. Cl.
*H04L 12/26* (2006.01)
*H04L 12/46* (2006.01)
*H04L 12/939* (2013.01)

(52) U.S. Cl.
CPC ........ *H04L 12/4633* (2013.01); *H04L 49/555* (2013.01)

(58) Field of Classification Search
CPC .......................... H04L 12/4633; H04L 49/555
(Continued)

(56) References Cited

U.S. PATENT DOCUMENTS

| 7,944,941 B1* | 5/2011 | Bottorff | H04J 3/1617 370/395.5 |
| 2005/0135803 A1* | 6/2005 | Lee | H04L 9/00 398/1 |
| 2013/0250865 A1* | 9/2013 | Ryan | H04W 88/085 370/329 |

FOREIGN PATENT DOCUMENTS

| EP | 2226954 | 9/2010 | |
| SE | WO2010/145187 A1 * | 12/2010 | |
| SE | WO 2010145187 A1 * | 12/2010 | H04W 88/085 |

OTHER PUBLICATIONS

International Preliminary Report on Patentability, Application No. PCT/EP2012/064408, dated Dec. 31, 2014, 8 pages.

(Continued)

*Primary Examiner* — Ricky Ngo
*Assistant Examiner* — Wei-Po Kao
(74) *Attorney, Agent, or Firm* — Nicholson De Vos Webster & Elliott LLP

(57) ABSTRACT

A Common Public Radio Interface (CPRI) link involves using a protocol stack having a CPRI layer and an emulation layer to emulate a point to point link, to enable the CPRI link to operate over a packet switched network. The emulation layer can be a pseudowire emulation which encapsulates multiple CPRI frames in a packet with overhead. A multiplexing layer such as Internet Protocol (IP) or Multiprotocol Label Switching (MPLS) can be used, for sending the packet over an Ethernet network. The usual need for a point to point infrastructure for the CPRI link can be avoided and the CPRI link can be implemented over more complex but usually cheaper packet networks, thus reducing costs or enabling more widespread application over existing packet networks. This applies whether the packet network is dedicated to the CPRI link, or shared with other packets. It can be useful for distributed radio base stations.

17 Claims, 9 Drawing Sheets

(58) Field of Classification Search
 USPC .................................. 370/310–350, 252, 253
 See application file for complete search history.

(56) References Cited

OTHER PUBLICATIONS

PCT International Search Report for Counterpart PCT Application No. PCT/EP2012/064408, (dated Feb. 20, 2013), 4 pages.
"Common Public Radio Interface (CPRI); Interface Specification", CPRI Specification V5.0, (Sep. 21, 2011), 119 pages.
"EPON vs. GPON—A Comparative Study", Whitepaper, members.westnet.com.au/.../GPON%20vs%20EPON%20whitepaper.pdf, (Nov. 22, 2004), 17 pages.
Bryant, et al., "Pseudo Wire Emulation Edge-to-Edge (PWE3) Architecture," *RFC 3985*, http://www.openrfc.org/rfc/3985.pdf, (Mar. 2005), 42 pages.
Tipmongkolsilp, et al., "The Evolution of Cellular Backhaul Technologies: Current Issues and Future Trends", *Communications Surveys & Tutorials, IEEE*, vol. 13, Issue:1, (2011), pp. 97-113.
Vainshtein, et al., "Structure-Agnostic Time Division Multiplexing (TDM) over Packet (SAToP)", *RFC 4553, The Internet Society*, (Jun. 2006), 27 pages.
Xiao, et al., "Requirements for Pseudo-Wire Emulation Edge-to-Edge (PWE3)", *RFC 3916, IETF, The Internet Society*, https://datatracker.ietf.org/doc/rfc3916/, (Sep. 2004), 19 pages.

\* cited by examiner

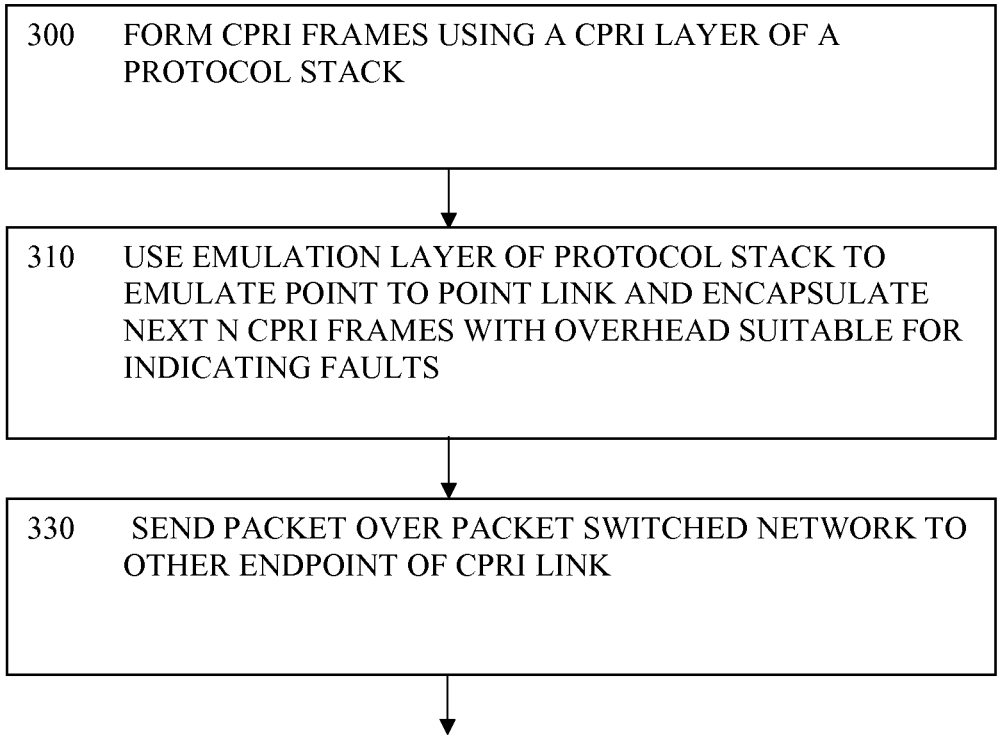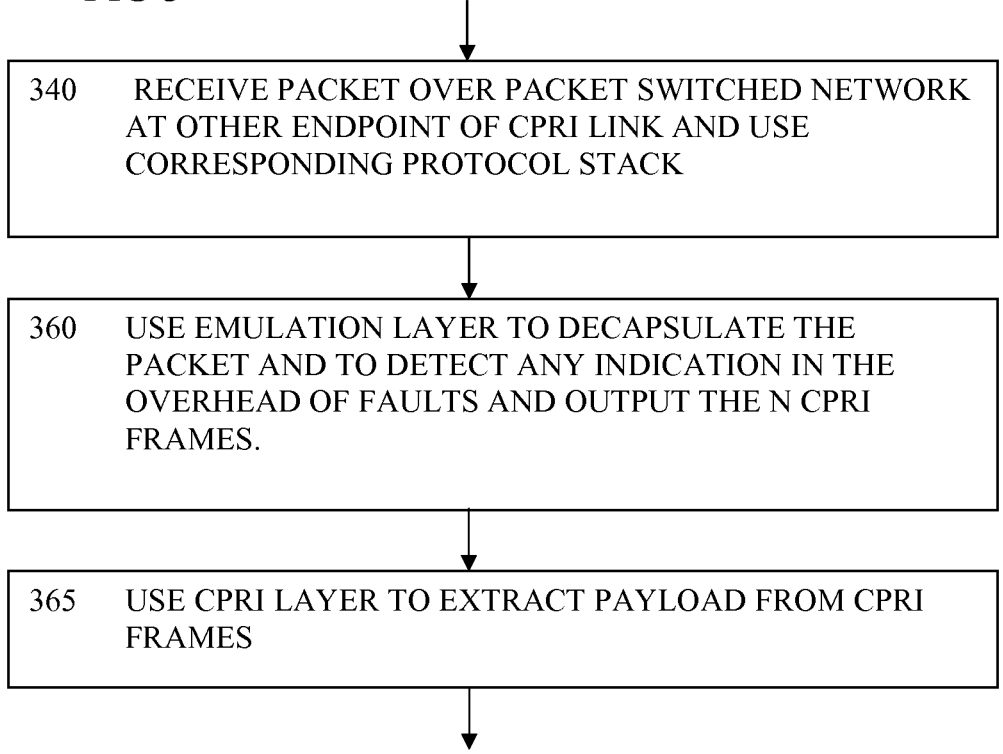

FIG 8

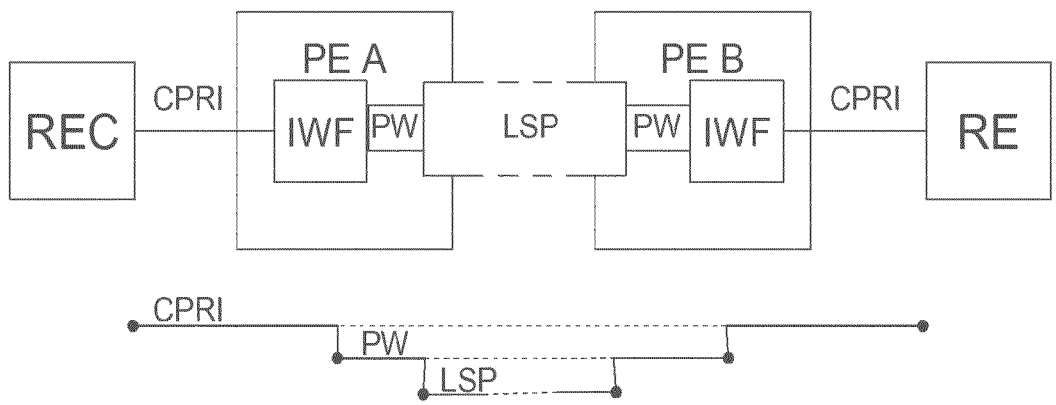

FIG 9
```
 0                   1                   2                   3
 0 1 2 3 4 5 6 7 8 9 0 1 2 3 4 5 6 7 8 9 0 1 2 3 4 5 6 7 8 9 0 1
|-|-|-|-|-|-|-|-|-|-|-|-|-|-|-|-|-|-|-|-|-|-|-|-|-|-|-|-|-|-|-|-|
|                              ...                              |
|                      MPLS and PW Label Stack                  |
|                              ...                              |
+=+=+=+=+=+=+=+=+=+=+=+=+=+=+=+=+=+=+=+=+=+=+=+=+=+=+=+=+=+=+=+=+
|                       CPRIoPW Control Word                    |
+=+=+=+=+=+=+=+=+=+=+=+=+=+=+=+=+=+=+=+=+=+=+=+=+=+=+=+=+=+=+=+=+
|                              ...                              |
|                       CPRI data (Payload)                     |
|                              ...                              |
+-+-+-+-+-+-+-+-+-+-+-+-+-+-+-+-+-+-+-+-+-+-+-+-+-+-+-+-+-+-+-+-+
```

FIG 10
```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0 0 0 0|L|R|   RSV   |    LEN    |         Sequence number    |
+-+-+-+-+-+-+-+-+-+-+-+-+-+-+-+-+-+-+-+-+-+-+-+-+-+-+-+-+-+-+-+-+
```

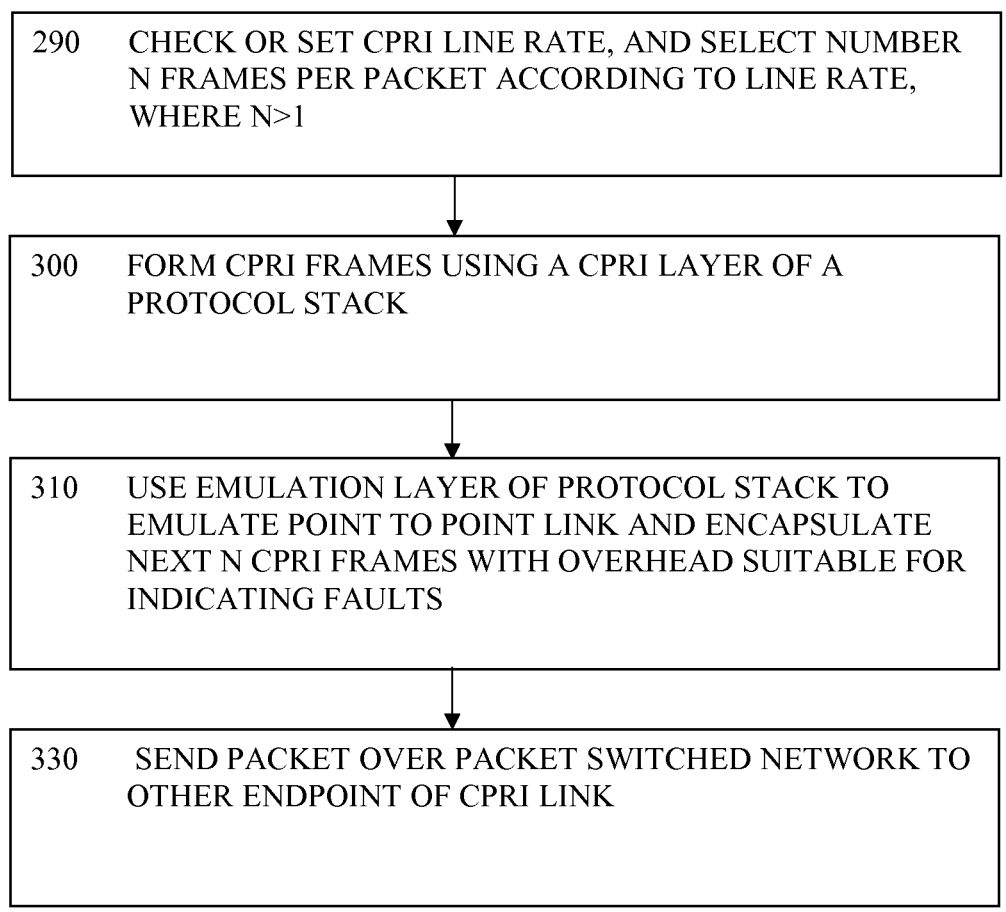

ENCAPSULATING CPRI FRAMES

CROSS-REFERENCE TO RELATED APPLICATIONS

This application is a National stage of International Application No. PCT/EP2012/064408, filed Jul. 23, 2012, which claims priority to European Application No. 12172751.5, filed Jun. 20, 2012, which are hereby incorporated by reference.

TECHNICAL FIELD

This invention relates to methods of operating a CPRI link, to corresponding apparatus for use as an endpoint of CPRI link, to parts of a base station of a mobile communications network, and to corresponding computer programs and to signals for transmission between endpoints of a CPRI link.

BACKGROUND

In a typical cellular radio system, wireless user equipment units (UEs) communicate via a radio access network (RAN) to one or more core networks. The user equipment units (UEs) can be mobile telephones laptop computers with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like. The radio access network (RAN) covers a geographical area which is divided into cell areas, with each cell area being served by a radio base station (e.g., BTS, RBS or NodeB). The radio base stations communicate over the air interface (e.g., radio frequencies) with the user equipment units (UE) within range of the base stations. In the radio access network, several base stations are typically connected (e.g., by landlines or microwave) to a control node known as a base station controller (BSC) or radio network controller (RNC). The control node supervises and coordinates various activities of the plural radio base stations connected thereto. The radio network controllers are typically connected to one or more core networks. One example of a radio access network is the Universal Mobile Telecommunications System (UMTS) Terrestrial Radio Access Network (UTRAN). The UMTS is a third generation system which builds upon the radio access technology known as Global System for Mobile communications (GSM) developed in Europe. UTRAN provides wideband code division multiple access (WCDMA) to UEs.

In many radio access networks the radio base station is located concentrated at a single site. However, a radio base station can also have a distributed architecture. For example, a distributed radio base station (RBS) can take the form of one or more radio equipment (RE) portions that are linked to a radio equipment control (REC) portion over a radio base station internal interface.

Such distributed radio base stations can have a processing Main Unit (MU) at the REC, and at the RE a set of antennas with dedicated RF equipment able to cover multiple radio cells (RRUs), where a single MU is shared among multiple RRUs. This new architectural approach in the RBS implementation requires high capacity, cost effective and low latency transport systems between MU (processing) and RRUs (antennas).

The Common Public Radio Interface (CPRI) is an example of an internal interface of a radio base station which links a radio equipment portion of the radio base station to a radio equipment control portion of the base station. The Common Public Radio Interface (CPRI) is described in Common Public Radio Interface (CPRI) Interface Specification Version 5.0 (2011). Other interfaces can be used, for example the Open Base Station Architecture Initiative (OBSAI) but such alternatives have not yet proved as popular.

This approach of providing "remotization" of the RF part of the RBS from the main unit can bring some notable advantages:

a) Rationalization of RBS processing unit, with benefits in terms of cost and power consumption,
b) Dynamic allocation of RF and/or processing resources depending on cell load and traffic profiles, and
c) Correlation of data supported by all the antennas which are afferent on the same processing unit. It increases radio link reliability, bandwidth, and coverage and optimizes the power consumption.

This can enable some "cloud computing" concepts to be applied to the radio access networks. Point to point (P2P) optical links can be used for the interface between the REC and the RE. For this interface, WDM systems, especially the ones used in the access (WDM-PON), can enable guaranteed low latency, protocol transparency, high bandwidth and an increased spectral efficiency. The costs, over a 2-5 year time scale projection, can be comparable with conventional optical access technologies, such as P2P and GPON. CPRI can be transmitted over P2P dedicated optical links. Notably CPRI has pressing constraints in terms of latency (round-trip delay) and in particular in terms of uplink/downlink synchronization.

The CPRI standard recites optical fibers for transmission link up to 10 km, recites determining a round trip delay, and specifies synchronisation and timing accuracies, e.g. link round trip delay accuracy of 16 nsecs.

SUMMARY

According to a first aspect of the invention there is provided a method of operating a CPRI link by forming CPRI frames using a CPRI layer of a protocol stack at one endpoint of the CPRI link, the protocol stack having the CPRI layer and an emulation layer to emulate a point to point link. This can enable the CPRI link to operate over a packet switched network having more than two nodes, using the emulation layer at the one endpoint to encapsulate a number of the CPRI frames in a packet with overhead suitable for indicating faults. The packet is then sent over the packet switched network to a corresponding protocol stack for receiving at the other endpoint of the link.

By emulating a point to point link, the usual need for a point to point infrastructure for the CPRI link can be avoided and the CPRI link can be implemented over more complex but usually cheaper packet networks, thus reducing costs or enabling more widespread application over existing packet networks. This applies whether the packet network is dedicated to the CPRI link, or is shared with other packets. See FIGS. 1 and 2 for example.

Any additional features can be added to those features or can be disclaimed from them while staying within the scope of the claims, and some such additional features are set out below. One such additional feature is the protocol stack having a multiplexing layer, and the method further comprising using the multiplexing layer at the one endpoint to supplement the packet with identification information to associate the packet with the emulated point to point link. By associating the packet with the emulated link, the packet network can be shared with other traffic, again helping to reduce costs. See FIGS. 4 and 5 for example.

Another such additional feature is steps of receiving the packet and using an emulation layer of a corresponding protocol stack to decapsulate the received packet, and detect any fault indication and output the CPRI frames. By having such steps in the corresponding receiving protocol stack, the receiving side can cooperate with the sending side to emulate the point to point link. See FIGS. 3 and 6 for example.

Another such additional feature is the corresponding protocol stack having a demultiplexing layer configured to recognise the identification information to associate the packet with the emulated point to point link. This can help enable the receiving side to distinguish packets in a shared packet network, again enabling costs of the infrastructure to be shared and thus helping reduce costs for the CPRI link. See FIG. 6 for example.

Another such additional feature is the emulation layer comprising a pseudo wire layer (PW). This is a well known type of emulation layer which can carry out functions such as carriage of the encapsulated data across a packet switched network tunnel, establishment of the PW, including the exchange and/or distribution of the PW identifiers used by the PSN tunnel endpoints, managing the signaling, timing, order, or other aspects of the service at the boundaries of the PW, and service-specific status and alarm management. See FIGS. 8 and 9 for example. Other types of emulation layer may be used if they can achieve similar functions.

Another such additional feature is the number of frames being encapsulated in each packet in the step of encapsulating being greater than one. This is not specified by the known pseudo wire layer, and can affect the efficiency of the scheme. As the size of CPRI frame depends on the line rate, by having more than one frame per packet, the trade off between packetisation delay and proportion of bandwidth used up with overhead can be improved.

Another such additional feature is the overhead comprising a control word (CPRI0PW Control Word) having an indication of a fault. This is can help manage the link in the event of faults and thus help reduce the consequential loss of data. See FIGS. 9 and 10 for example.

Another such additional feature is the multiplexing layer comprising a label switched network layer and the identification information comprising a label. This is now a commonly used type of network layer and thus by enabling the CPRI link to use such a layer, the costs of installing and operating the CPRI link can be reduced. See FIGS. 8 and 9 for example.

Another such additional feature is the packet switched network comprising an ethernet network (31). Again this is now a commonly used type of packet switched network and thus by enabling the CPRI link to use such a layer, the costs of installing and operating the CPRI link can be reduced. See FIG. 4 for example.

Another such additional feature is the overhead comprising an indication (L, R) of which of the layers has a fault. This is can help manage the link in the event of faults and thus help reduce the consequential loss of data. See FIG. 10 for example.

Another aspect of the invention provides apparatus for a base station of a mobile communications network the apparatus being configured as an endpoint of a CPRI link for sending CPRI frames to another end point of the CPRI link. The apparatus has a processor configured to run a protocol stack for sending the CPRI frames, the protocol stack having a CPRI layer and an emulation layer to emulate a point to point link, to enable the emulated point to point link to use a packet switched network. The CPRI layer is arranged to form the CPRI frames, and the emulation layer can be configured to encapsulate a number of the CPRI frames in a packet with overhead (L,R) suitable for indicating faults. The apparatus has a packet network interface coupled to the processor to send the packets over a packet network to the other endpoint of the CPRI link. See FIGS. 1 and 4 for example.

Another such additional feature is the apparatus comprising a radio controller part of a radio base station. See FIGS. 4 and 12 for example. Another such additional feature is the apparatus comprising a radio equipment part of a radio base station. See FIGS. 4 and 12 for example. Another such additional feature is the protocol stack also having a multiplexing layer configured to supplement the packet with identification information to associate the packet with the emulated point to point link.

Another such additional feature is the processor being configured to run a corresponding protocol stack for receiving supplemented packets containing CPRI frames sent over the packet network from the other endpoint of the CPRI link, the corresponding protocol stack having a demultiplexing layer configured to recognise the identification information and having an emulation layer configured to decapsulate the received packet, and detect any fault indication and output the CPRI frames.

Another such additional feature is the emulation layer comprising a pseudo wire layer (PW). Another such additional feature is the packet switched network comprising an ethernet network. Another such additional feature is the apparatus being configured to carry out the method steps set out above.

Another aspect of the invention provides a computer program having machine-readable instructions which when executed by a processor causes the processor to perform any of the methods set out above.

Another aspect of the invention provides a signal comprising two or more CPRI frames encapsulated in a packet with overhead suitable for indicating faults, and having additional identification information to supplement the packet to associate the packet with an emulated point to point link so as to enable the packet to be multiplexed with other packets and sent over a shared packet switched network. See FIG. 9 for example. Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

Embodiments of the invention will be described, by way of example only, with reference to the accompanying drawings in which:

FIG. 2 shows steps at a sending side according to an embodiment, FIG. 3 shows steps at a receiving side according to an embodiment, FIG. 8 shows a schematic view of apparatus and protocol layers according to an embodiment using PW and an LSP.

FIG. 9 shows a schematic view of a packet structure according to an embodiment having a control word in the overhead, FIG. 10 shows a schematic view of a control word for use in embodiments.

FIG. 11 shows steps at a sending side according to an embodiment involving selecting a number of CPRI frames to be encapsulated.

DETAILED DESCRIPTION

Figure 1:
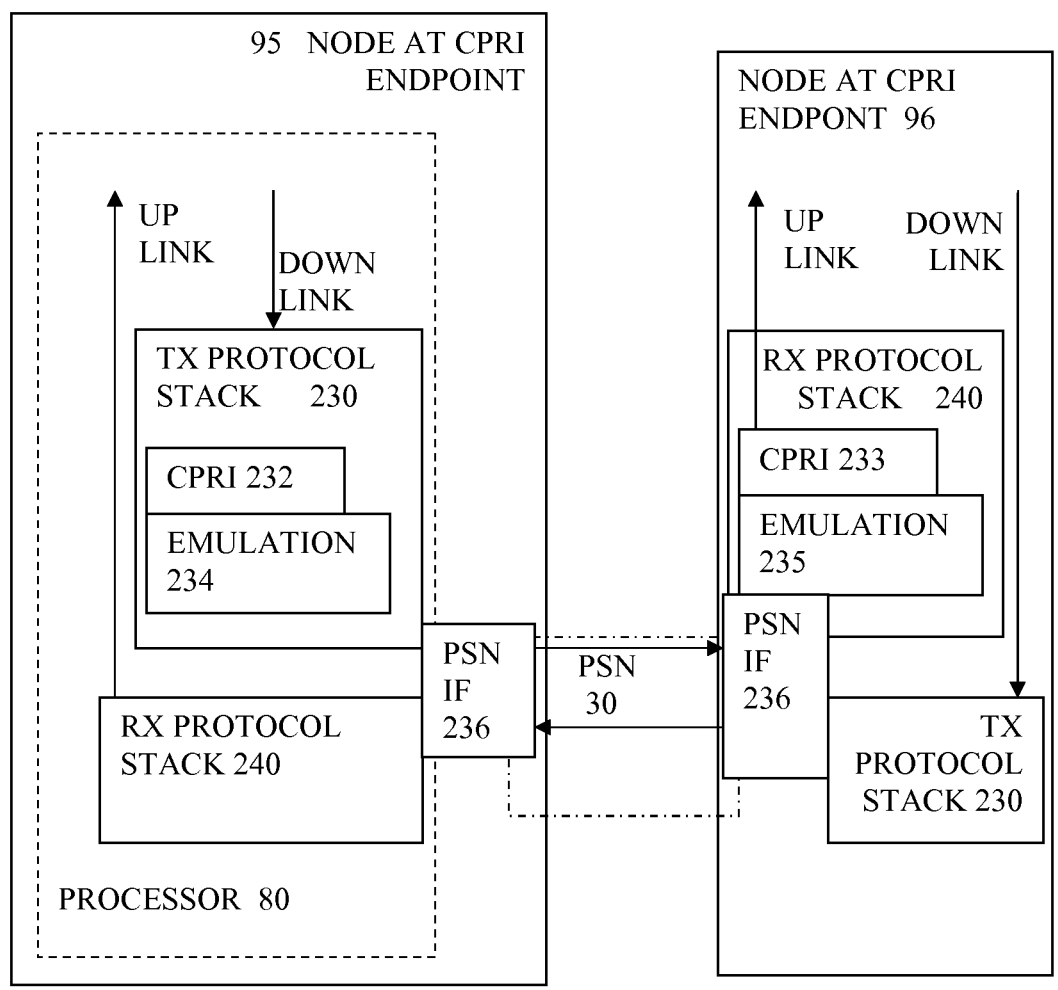
FIG. 1 shows a schematic view of apparatus according to an embodiment of the invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes.

Abbreviations:

| | |
|---|---|
| C&M | Control and Management |
| CPRI | Common Public Radio Interface |
| CW | Control Word |
| IWF | InterWorking Function |
| MPLS | MultiProtocol Label Switching |
| PE | Provider Edge |
| PSN | Packet Switched Network |
| PW | Pseudowire |
| RE | Radio Equipment |
| REC | Radio Equipment Control |

Definitions

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of switching node, not limited to the types described, not limited to any level of integration, or size or bandwidth or bit rate and so on.

References to radio base stations are intended to encompass any type of radio base station, not limited to the standards or examples described.

References to CPRI links are intended to encompass links meeting the CPRI standard as may be updated from time to time, and to links meeting similar standards having essentially similar functions as may be devised in the future.

References to programs or software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

The functionality described herein can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Embodiments can be programs in the form of machine-readable instructions (software) which, when executed by a processor, perform any of the described methods. The programs may be stored on an electronic memory device, hard disk, optical disk or other machine-readable storage medium or non-transitory medium. The programs can be downloaded to the storage medium via a network connection.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

By way of introduction to features of embodiments of the invention, some discussion of known features will be presented. There is a notable increase in use of full IP Ethernet architectures, and a trend away from using SDH/TDM infrastructure for applications such as mobile backhauling (MBH). The future of the networks operating with mobile traffic will be either IP or MPLS. Currently there is no way to use Ethernet to transport CPRI traffic which requires a point to point link, and this could affect the future applicability of this protocol.

FIGS. 1 and 2, a First Embodiment.

FIG. 1 shows a schematic view of apparatus at each end of a CPRI link. A node 95 forms one endpoint, and node 96 forms the other endpoint. They typically have a processor 80 for running various functions including running protocol stacks. These endpoints can be located within a radio base station for communication between parts of the radio base station, or can be used in other applications having similar requirements. In node 95 data to be sent over a down link to the other node is fed to a TX protocol stack 230 for sending over a PSN 30. This protocol stack has a CPRI layer 232, an emulation layer 234 for emulating a point to point link, and the apparatus has a packet network interface PSN IF 236 for sending over the packet network. A corresponding inward protocol stack 240 with similar layers can be provided for receiving the incoming Uplink data from the node at the other endpoint.

At the other endpoint 96 there is shown a similar PSN IF 236 for receiving the packet and passing to a processor (not shown for the sake of clarity), configured to run a corresponding receiving protocol stack RX 240 which receives incoming packets from the PSN IF and passes them to an emulation layer 235 which cooperates with the corresponding emulation layer in the outward protocol stack, and a CPRI layer 233. This emulation layer emulates a point to point link and enables the CPRI layer 233 in the inward protocol stack to operate without a real point to point link. The CPRI layer outputs the originally transmitted uplink signals to the node. In the other direction, the downlink signals are fed from the node 96 to a transmitting TX protocol stack 230 which has the same layers as the TX protocol stack 230 of the other endpoint 95. FIG. 2 shows operational steps according to an embodiment which may be the apparatus of FIG. 1 or other apparatus embodiments. At step 300, CPRI frames are formed using a CPRI layer of a protocol stack. At step 310 the emulation layer takes the next N CPRI frames and encapsulates them with overhead suitable for indicating faults, to form a packet. The number N can be selected so as to avoid too much packetisation delay and yet not reduce efficiency too much by adding too much overhead. At step 330, the packet is sent out over the packet switched network to the other endpoint of the CPRI link.

A notable advantage of this is to enable the use of a packet network such as Ethernet to transport the CPRI traffic, even though the packet network is not point to point and has more than two nodes. By overcoming the intrinsic incompatibility between CPRI and packet switched networks, there is less need for such costly infrastructure. Hence this can facilitate cost reduction and more widespread applicability of the CPRI protocol.

FIG. 3, Steps at a Receiving Side According to an Embodiment.

FIG. 3 shows steps at a receiving side such as step 340 of receiving a packet over the packet switched network and using a receiving (RX) protocol stack corresponding to the sending protocol stack. At step 360 an emulation layer is used to decapsulate the packet and detect any indication in the overhead of any faults in the transmission. The N CPRI frames in the payload are recognised and output to the CPRI layer. The original data can then be extracted from the CPRI frames at step 365. The possible different data streams within the CPRI frame are discussed in more detail below.

Figure 4:
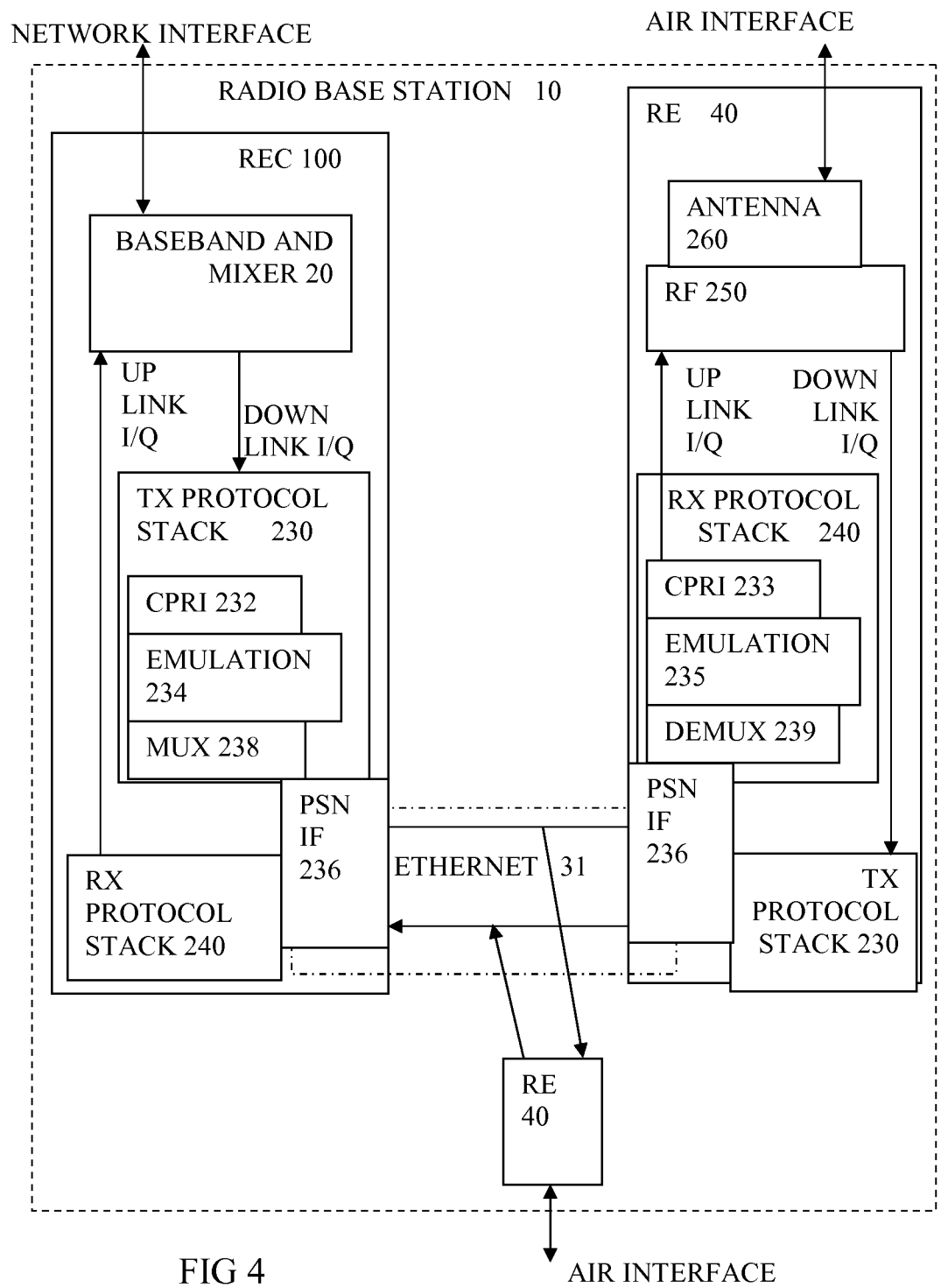
FIG. 4 shows a schematic view of apparatus according to an embodiment having multiplexing.
Figure 5:
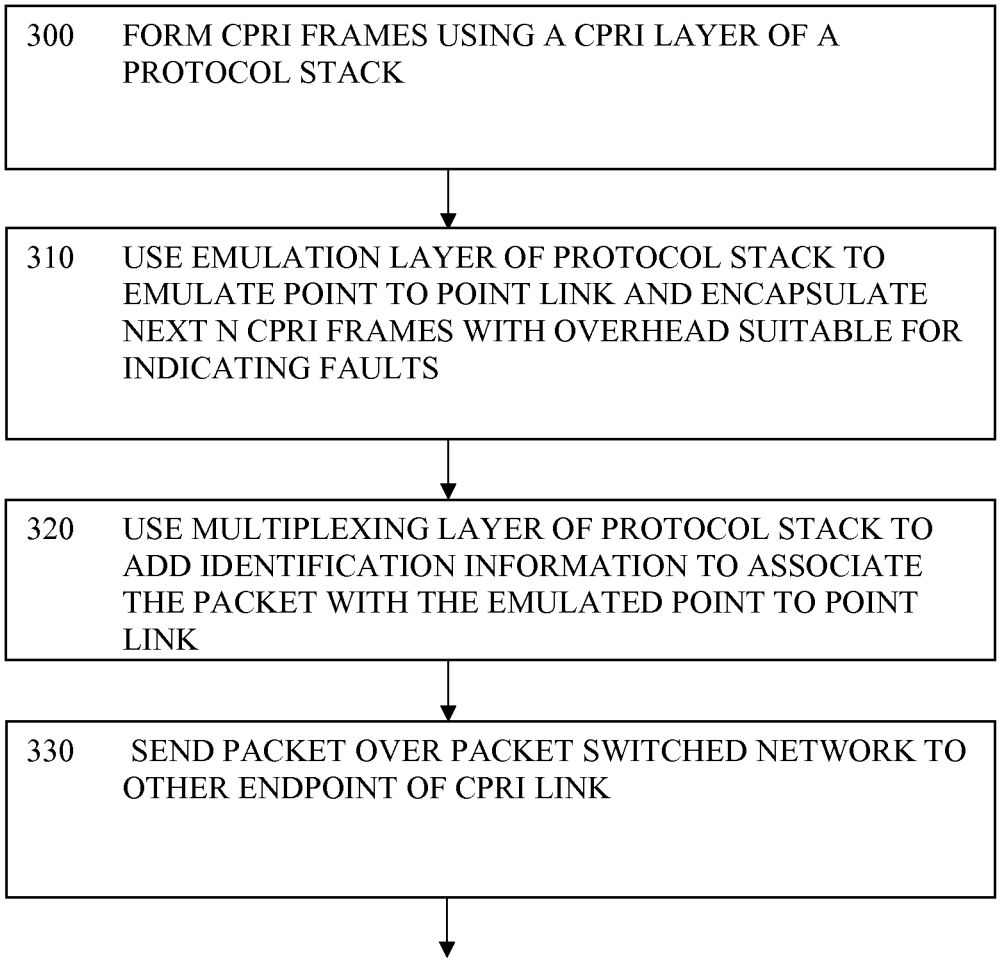
FIG. 5 shows steps according to an embodiment having multiplexing to enable use of a shared packet network.
Figure 6:
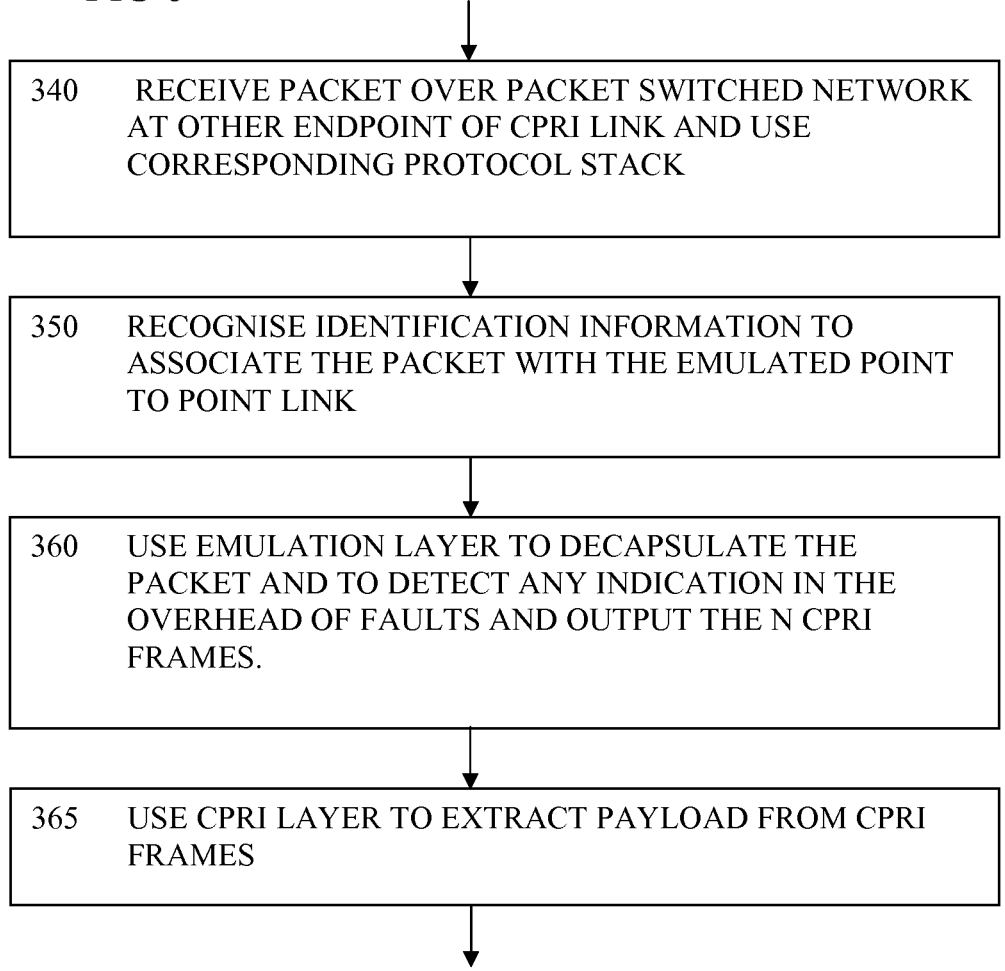
FIG. 6 shows steps at a receiving side according to an embodiment having multiplexing.

FIGS. 4 to 6, Embodiments Having Multiplexing to Enable Use of Shared Packet Network FIG. 4 shows a schematic view of an embodiment similar to that of FIG. 1 and corresponding reference signs are used as appropriate. FIG. 4 shows a schematic view of apparatus in the form of some parts of a radio base station 10 including a REC 100 and two or more REs 40, each of which may have one or more processors for carrying out the various functions. The processors can be as shown in FIG. 1. The REs are coupled to the REC by a packet switched network such as an Ethernet network 31. The REC 100 has a baseband and mixer part 20 which has a network interface to the rest of the mobile communications network and which produces downlink digital I/Q signals and receives uplink digital I/Q signals. An outward protocol stack 230 is shown similar to that of FIG. 1, for sending these downlink digital I/Q signals over the shared PSN. This protocol stack has a CPRI layer 232, an emulation layer 234 for emulating a point to point link, and in this example it also has a multiplexing layer 238 for enabling multiplexing onto a shared packet network via the PSN IF 236. This multiplexing layer can use for example IP or MPLS or other known examples. A corresponding inward protocol stack 240 with similar layers can be provided for receiving the incoming Uplink I/Q data from the REs via the PSN IF 236.

At the RE there is shown an antenna 260 having an air interface, RF 250 circuitry coupled to the antenna for converting between digital and analog domains and converting frequency, and matching impedances as needed. These parts can be conventional. The inward corresponding protocol stack 240 at the RE has a demux layer 239, and an emulation layer 235 which cooperates with the corresponding emulation layer in the outward protocol stack. The CPRI layer outputs the uplink digital I/Q signals to the RF circuitry. In the other direction, the downlink I/Q signals are fed from the RF circuitry to an outward protocol stack 230 which has the same layers as the outward protocol stack 230 of the REC.

FIG. 5 shows steps similar to those of FIG. 2, but for an embodiment having multiplexing. In addition there is a step 320 after the emulation step 310, which involves adding identification information by the multiplexing layer so as to associate the packet with the emulated point to point link.

FIG. 6 shows steps at a receiving side similar to those of FIG. 3, and according to an embodiment having multiplexing. In addition there is a step 350 after the receiving step 340. At step 350, the demux layer recognises identification information to associate the packet with the emulated point to point link. Then the packet can be decapsulated as in FIG. 3.

FIG. 7, CPRI

CPRI defines the layer 1 and layer 2 protocols for the transfer of user plane, C&M as well as synchronization information between REC and RE as well as between two REs. The data flows carried can be summarised as follows:
Control Plane: Control data flow used for call processing.
Management Plane: This data is management information for the operation, administration and maintenance of the CPRI link and the nodes.
User Plane: Data that has to be transferred from the radio base station to the mobile station and vice versa.
Synchronization: Data flow which transfers synchronization and timing information between nodes.

A more detailed list of types of information flows is as follows:
  a) I/Q Data: User plane information in the form of in-phase and quadrature modulation data (digital baseband signals).
  b) Synchronization: Synchronization data used for frame and time alignment.
  c) L1 Inband Protocol: Signalling information that is related to the link and is directly transported by the physical layer. This information is required, e.g. for system start-up, layer 1 link maintenance and the transfer of time critical information that has a direct time relationship to layer 1 user data.
  d) C&M data: Control and management information exchanged between the control and management entities within the REC and the RE. This information flow is given to the higher protocol layers.

e) Protocol Extensions: This information flow is reserved for future protocol extensions. It may be used to support, e.g., more complex interconnection topologies or other radio standards.

f) Vendor Specific Information: This information flow is reserved for vendor specific information.

Figure 7:
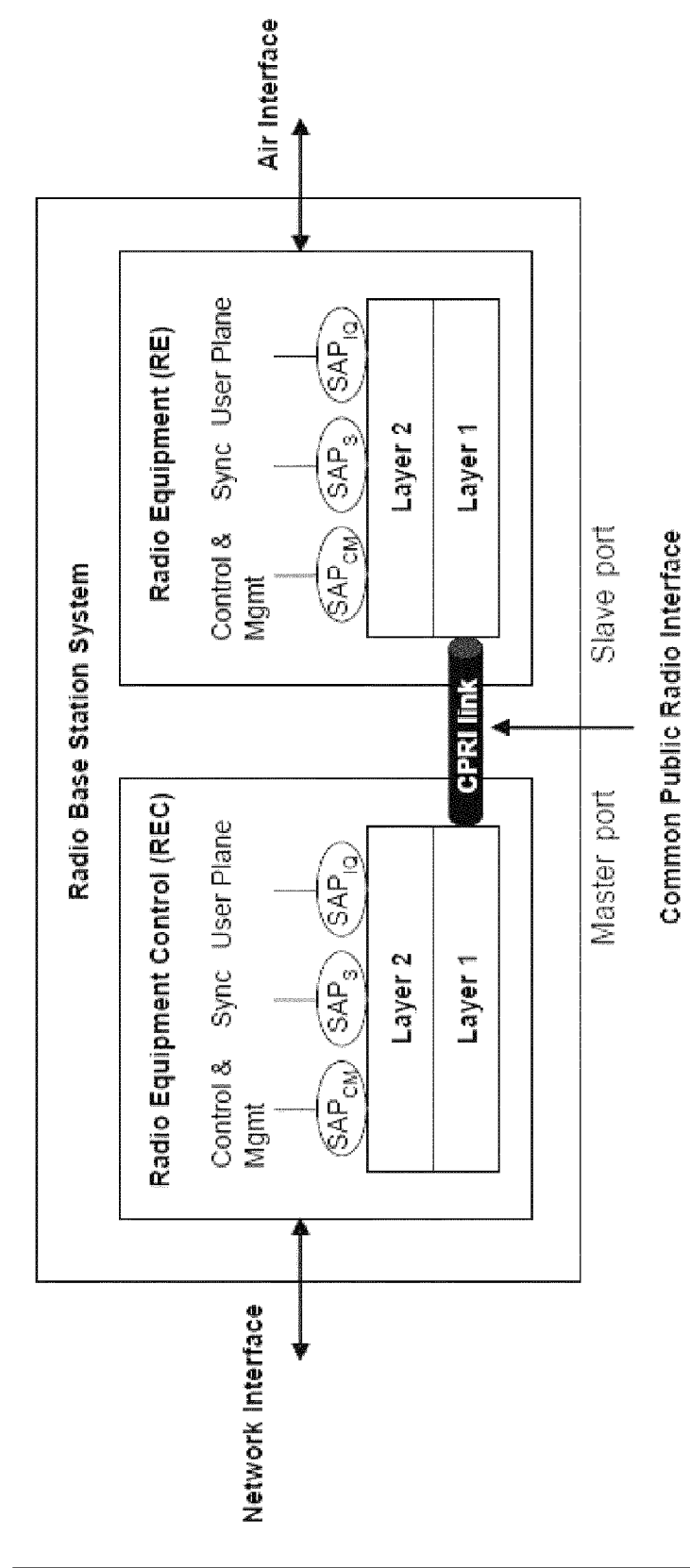
FIG. 7 shows a schematic view of a radio base station to show features of a CPRI link.

FIG. 7 shows a radio base station system with an REC coupled to an RE by a CPRI link. Three data paths are shown. The control plane and management plane data is mapped to a Service Access Point $SAP_{CM}$. There is an associated $SAP_{CM}$ at the RE side. There are also SAPs for synchronisation ($SAP_S$) and for I/Q data ($SAP_{I/Q}$). For radio base stations with a suitable functional decomposition, the user plane data is transported in the form of I/Q data. Several I/Q data flows can be sent via one physical CPRI link. Each I/Q data flow reflects the data of one antenna for one carrier, the so-called antenna-carrier (AxC). For radio base stations with other functional decompositions, the user plane data may not be I/Q data. A protocol stack for layers 1 and 2 is shown and the CPRI link is shown at the layer 1 level, between a master port at the REC, and a slave port at the RE.

Radio Functionality

The functional split between REC and RE, can take various forms. The REC is concerned with the Network Interface transport, the radio base station control and management as well as the digital baseband processing. The RE provides the analogue and radio frequency functions such as filtering, modulation, frequency conversion and amplification. An overview on the functional separation between REC and RE is given in the CPRI specification for UTRA FDD, for WiMAX and E-UTRA and for GSM. A functional split of base stations that is different from this section is not precluded by the CPRI specification.

The synchronization part of the interface can include mechanisms to provide precise frame timing information from the REC to the RE. The frame timing information can be recovered on the RE in order to achieve the timing accuracy requirements as described below. The RE can forward frame timing information transparently when forwarding from a slave port to all the master ports. The frame timing information is allocated to the service access point SAPs. Notably CPRI provides a requirement for Round Trip Delay Accuracy according to the supported radio standards.

The description that follows is based on the UMTS (Universal Mobile Telecommunication System) nomenclature. However, the radio base station and the interface may operate in accordance with other radio standards. The REC can provide an access towards a Radio Network Controller via the Iub interface (for the UMTS radio access network). Basically, the REC is concerned with the Iub transport and Iub protocols, the Node B (base station) control and management, as well as the digital baseband processing. For the downlink (i.e., from REC to RE), the REC can handle such operations as channel coding, interleaving, spreading, scrambling, adding of physical channels, controlling transmit power of each physical channel, frame and slot signal generation (including clock stabilization). For the uplink (i.e., from RE to REC), the REC can handle such operations as channel de-coding, de-interleaving, de-spreading, de-scrambling, signal distribution to signal processing units, detection of feedback information for transmit power control, and signal to interference ratio measurement.

The RE serves the air interface to the user equipment (in an UMTS network the air interface is called the Uu interface). The user equipment unit, or mobile station, is not illustrated here. The RE provides the analogue and radio frequency functions such as filtering, modulation, frequency conversion and amplification. For the downlink, the RE can perform operations such as digital to analogue conversion, up conversion, on/off control of each carrier, carrier multiplexing, power amplification and limiting, antenna supervision, and RF filtering. For the uplink, the RE can perform operations such as analogue to digital conversion, down conversion, automatic gain control, carrier de-multiplexing, low noise amplification, and RF filtering.

Thus, the REC comprises the radio functions of the digital baseband domain, whereas the RE contains the analogue radio frequency functions. The functional split between both parts can be done in such a way that a generic interface based on In-Phase and Quadrature (I/Q) data can be defined.

FIG. 8, Pseudo Wire Embodiment

Pseudowire is a standard for an emulation of a point-to-point or point-to-multipoint link, and provides a single service which is perceived by its user as an unshared link or circuit of the chosen service. It is not intended that an emulated service will be completely indistinguishable from the service that is being emulated.

The emulation need only be sufficient for the satisfactory operation of the service. Emulation necessarily involves a degree of cost-performance trade-off. In some cases it may be necessary to design more than one emulation mechanism in order to resolve these design conflicts. All emulated service definitions should include an applicability statement describing the faithfulness of the emulation. PWs have been used to emulate different kinds of Layer 1 and Layer 2 technologies such as SDH, SONET, ATM, and HDLC. A logical protocol-layer model required to support a PW is shown in FIG. 8. RFC 3985 describes Pseudo Wire Emulation in the following terms. PWE3 is Edge-to-Edge (PWE3) in support of [RFC3916]. Emulation of services such as Frame Relay, ATM, Ethernet, TDM, and SONET/SDH over packet switched networks (PSNs) can be achieved using IP or MPLS. PWE3 is a mechanism that emulates the essential attributes of a telecommunications service (such as a T1 leased line or Frame Relay) over a PSN. PWE3 is intended to provide only the minimum necessary functionality to emulate the wire with the required degree of faithfulness for the given service definition. Any required switching functionality is the responsibility of a forwarder function.

Any translation or other operation needing knowledge of the payload semantics is carried out by native service processing (NSP) elements. The required functions of PWs include encapsulating service-specific bit streams, cells, or PDUs arriving at an ingress port and carrying them across an IP path or MPLS tunnel. In some cases it is necessary to perform other operations such as managing their timing and order, to emulate the behavior and characteristics of the service to the required degree of faithfulness.

From the perspective of Customer Edge Equipment (CE), the PW is characterized as an unshared link or circuit of the chosen service. For each service type, there will be one default mode of operation that all PEs offering that service type must support. However, optional modes may be defined. PWs provide the following functions in order to emulate the behaviour and characteristics of the native service.

a) Encapsulation of service-specific PDUs or circuit data arriving at the PE-bound port (logical or physical).

b) Carriage of the encapsulated data across a PSN tunnel.

c) Establishment of the PW, including the exchange and/or distribution of the PW identifiers used by the PSN tunnel endpoints.

d) Managing the signaling, timing, order, or other aspects of the service at the boundaries of the PW.

e) Service-specific status and alarm management.

FIG. 8 shows a schematic view of an embodiment of apparatus using PW and showing logical layers. A REC at one end of the CPRI link has a CPRI layer to generate CPRI frames. These are fed to PE A at the REC which has an interworking function IWF. This generates the pseudo wire packets by encapsulation of the CPRI frames. Then the multiplexing layer in the form of the LSP function, (or any type of MPLS network) generates the identification information in the form of the label. This enables any intermediate nodes to identify the packet, so that the packet can be routed and so that the network can be shared with other traffic. At the receiving side there is a corresponding protocol stack which recognises and takes off the label to retrieve the PW packet. An IWF at PE B takes off the packet overhead to recover the CPRI frame which is fed to the CPRI processing part at the RE. Three nested layers can be identified in this scheme as shown schematically in FIG. 8: a CPRI layer above a PW layer above a label switched packet layer.

CPRI Line Rates

The length of a basic frame is 1 Tc=1/fc=1/3.84 MHz=260.416667 ns. A basic frame consists of 16 words. The length T of the word depends on the CPRI line bit rate as shown in the following table.

TABLE 1 length T of the word

| CPRI line bit rate [Mbit/s] | length of word [bit] | Length of frame [octets] |
|---|---|---|
| 614.4 | T = 8 | 128 |
| 1228.8 | T = 16 | 256 |
| 2457.6 | T = 32 | 512 |
| 3072.0 | T = 40 | 640 |
| 4915.2 | T = 64 | 1024 |
| 6144.0 | T = 80 | 1280 |
| 9830.4 | T = 128 | 2048 |

FIG. 9, Packet Structure with PW Encapsulation According to an Embodiment

CPRI over PW (CPRIoPW) structure agnostic encapsulation is sufficient, even though structure aware encapsulation could be possible (but it's probably an over-engineering of the function). PW may also be carried over a Packet Switched Network (PSN) different from MPLS, but MPLS is taken as an example—for the purposes of detailed description—because it is the most common technology for carrier Ethernet and packet transport (in case of MPLS-TP). An example of a structure CPRIoPW packet format is shown in FIG. 9. This shows a first 4 words of 32 bits making up the MPLS and PW label stack, followed by one word being the control word for CPRI over PW, followed by a CPRI data payload of 4 or more 32 bit words. The amount of payload depends on the number of CPRI frames encapsulated and the length of each CPRI frame (which depends on the selected CPRI line rate as explained above).

CPRI Delay Considerations

CPRI interface is very strict in terms of delay of the interface. In order to leave packetization delay very small, it is possible to encapsulate within a single PW Payload a multiple of 128 octets, up to the supported MTU (several times MTU on Ethernet interfaces is limited to 2048 octets, comprising Ethernet header, MPLS header, PW and Control Word header, PW Payload and Ethernet FCS). Depending on the CPRI rate, the packetization delay may be a sub-multiple or multiple of Tc (from 16.276042 ns to 4166.667 ns). The number of frames encapsulated in each packet can be selected to stay within the CPRI delay limits.

The Control Word CW for CPRI over PW encapsulation can be used for the following functions:

Detection of packet loss or misordering;

Differentiation between the PSN and attachment circuit problems as causes for the outage of the emulated service:

PSN bandwidth conservation by not transferring invalid data (AIS);

Signaling of faults detected at the PW egress to the PW ingress.

The format of the CW in this example is shown in FIG. 10 and is similar to the one used for SAToP (RFC 4553), though other examples can be envisaged. As shown in FIG. 10, the bits 0-3 are set to zero, bit 4 is L, bit 5 is R, bits 6 to 9 are RSV, bits 10 to 15 are LEN, and bits 16 to 32 are a sequence number. Other variations are possible.

L—If set, indicates that CPRI data carried in the payload is invalid due to an attachment circuit fault (e.g. Link Down). When the L bit is set the payload MAY be omitted in order to conserve bandwidth. Once set, if the fault is rectified, the L bit MUST be cleared.

R—If set by the PSN-bound IWF, indicates that its local CE-bound IWF is in the packet loss state, i.e., has lost a preconfigured number of consecutive packets. The R bit MUST be cleared by the PSN-bound IWF once its local CE-bound IWF has exited the packet loss state, i.e., has received a preconfigured number of consecutive packets.

RSV—MUST be set to 0 by the PSN-bound IWF and MUST be ignored by the CE-bound IWF.

LEN—Is short for "length" and is in bits 10 to 15, and can be used to carry the length of the CPRIoPW packet, but may be optional.

Sequence number—can be used to provide the common PW sequencing function as well as detection of lost packets. It can generated in the following way, though alternatives can be envisaged:

Its space is a 16-bit unsigned circular space

Its initial value SHOULD be random (unpredictable).

It MUST be incremented with each CPRIoPW data packet sent in the specific PW. RTP header is not required for this encapsulation.

FIG. 11, Embodiment Involving Selecting Number of CPRI Frames to be Encapsulated FIG. 11 shows an embodiment having steps similar to those of FIG. 2. In this case there is a preliminary step 290 which may be a configuration step before operation, of selecting a number N of how many CPRI frames are to be in the payload of each of the packets. This can involve checking or setting the CPRI line rate, which determines the length of the frames, then selecting N. The selection can be made to ensure the packet is not so long that CPRI delay restrictions are breached by the wait to gather enough frames to form the packet.

Figure 12:
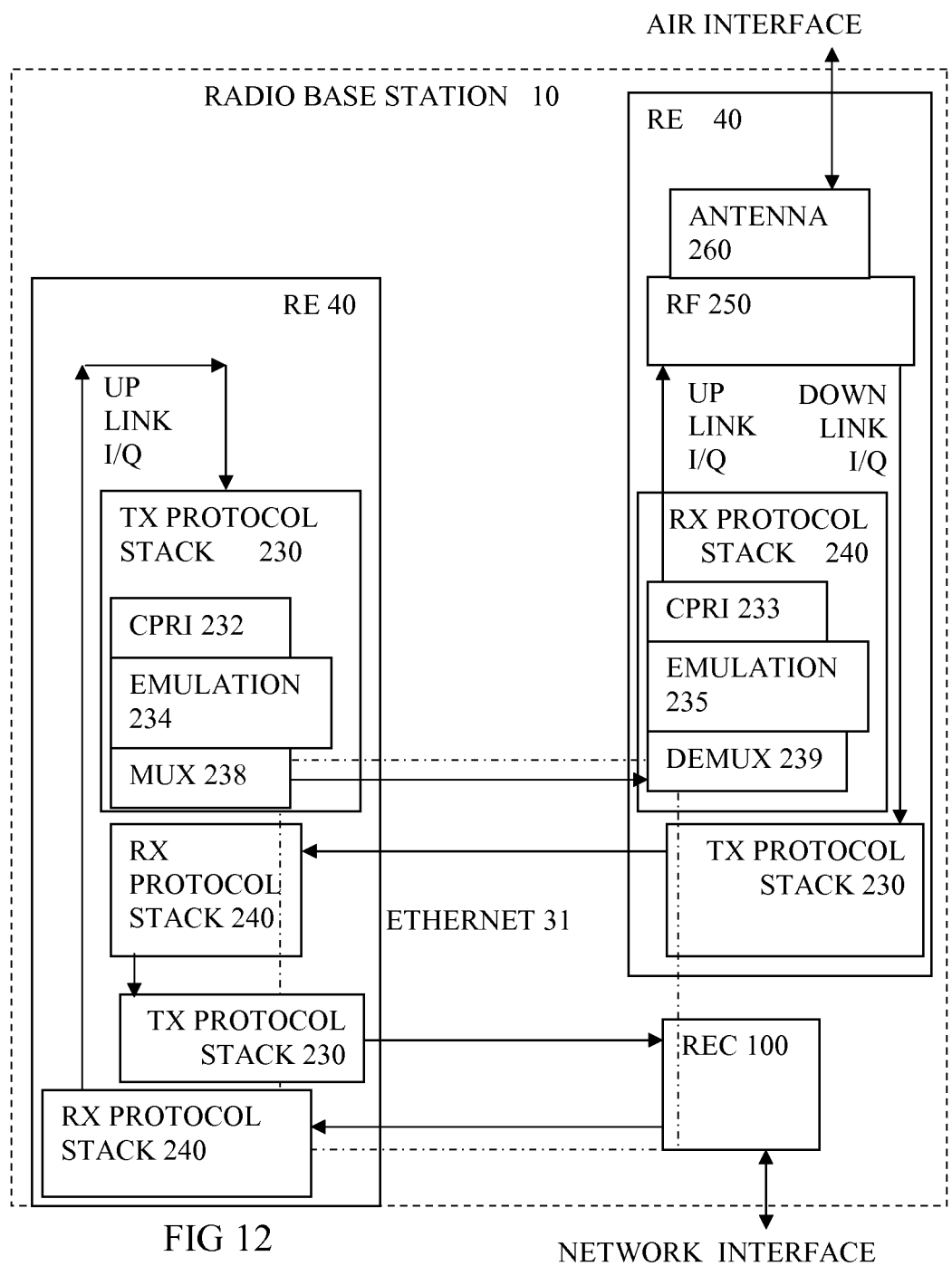
FIG. 12 shows a schematic view of apparatus according to an embodiment having a chain of CPRI links between parts of a radio base station.

FIG. 12, Embodiment Having Chain of CPRI Links Between Parts of Radio Base Station FIG. 12 shows a schematic view of an embodiment similar to that of FIG. 4, but with a chain of REs 40, coupled to an REC 100. In this case one of the REs is acting as an intermediate node in the chain. It is shown as having a pair of protocol stacks for the two paths to and from the REC and a pair of protocol stacks for the two paths to and from the other RE 40. In the intermediate node the data received from the REC by an RX protocol stack is passed to a TX protocol stack to be sent on to the other RE. Optionally the demux layer of the RX protocol stack can be used to determine whether the packet is for its own RE, or is to be passed on to the other RE. Optionally if the data is to be passed on it could be passed from the RX stack to the TX protocol stack at a lower level than the CPRI level. The processors can be as shown in FIG. 1, the packet network interface parts 236 can be as shown in FIG. 1, they are not shown for the sake of clarity.

Other variations and embodiments can be envisaged within the claims.

The invention claimed is:

1. A method of operating a Common Public Radio Interface (CPRI) link, comprising:
   forming, by one endpoint of the CPRI link, CPRI frames using a CPRI layer of a protocol stack, the protocol stack having the CPRI layer and an emulation layer to emulate a point to point link, to enable the CPRI link to operate over a packet switched network having more than two nodes;
   selecting a number of CPRI frames to encapsulate in a packet by:
      determining a CPRI line rate associated with the CPRI link;
      determining, based on the determined CPRI line rate associated with the CPRI link, a length of the CPRI frames; and
      selecting, based on the determined length of the CPRI frames, the number of CPRI frames to ensure the CPRI link stays within CPRI delay limits;
   using the emulation layer at the one endpoint to encapsulate the selected number of CPRI frames in the packet with overhead suitable for indicating faults;
   using a multiplexing layer of the protocol stack at the one endpoint to supplement the packet with identification information to associate the packet with the emulated point to point link; and
   sending, by the one endpoint of the CPRI link, the packet over the packet switched network to a corresponding protocol stack for receiving at another endpoint of the link.

2. The method of claim 1, further comprising receiving the packet and using an emulation layer of a corresponding protocol stack to decapsulate the received packet, and detect any fault indication and output the CPRI frames.

3. The method of claim 2, wherein the corresponding protocol stack comprises a demultiplexing layer configured to recognise the identification information to associate the packet with the emulated point to point link.

4. The method of claim 1, wherein the emulation layer of the protocol stack comprises a pseudo wire layer.

5. The method of claim 1, wherein the number of CPRI frames being encapsulated in each packet is greater than one.

6. The method of claim 1, wherein the overhead comprises a control word having an indication of a fault.

7. The method of claim 1, wherein the multiplexing layer comprises a label switched network layer and the identification information comprises a label.

8. The method of claim 1, wherein the packet switched network comprises an ethernet network.

9. The method of claim 1, wherein the overhead comprises an indication of which of the layers has a fault.

10. An apparatus for use as an endpoint of a Common Public Radio Interface (CPRI) link for sending CPRI frames to another end point of the CPRI link, the apparatus comprising:
   a processor configured to run a protocol stack for sending the CPRI frames, the protocol stack comprising a CPRI layer and an emulation layer to emulate a point to point link, to enable the emulated point to point link to use a packet switched network, the CPRI layer configured to form the CPRI frames, and the emulation layer configured to select a number of CPRI frames to encapsulate in a packet by: determining a CPRI line rate associated with the CPRI link; determining, based on the determined CPRI line rate associated with the CPRI link, a length of the CPRI frames; and selecting, based on the determined length of the CPRI frames, the number of CPRI frames to ensure the CPRI link stays within CPRI delay limits, and to encapsulate the selected number of CPRI frames in the packet with overhead suitable for indicating faults;
   the protocol stack further comprising a multiplexing layer configured to supplement the packet with identification information to associate the packet with the emulated point to point link; and
   a packet network interface coupled to the processor to send the packets over a packet network to another endpoint of the CPRI link.

11. The apparatus of claim 10, further comprising a radio controller part of a radio base station.

12. The apparatus of claim 10, further comprising a radio equipment part of a radio base station.

13. The apparatus of claim 10, wherein the processor is further configured to run a corresponding protocol stack for receiving supplemented packets containing CPRI frames sent over the packet network from another endpoint of the CPRI link, the corresponding protocol stack comprising a demultiplexing layer configured to recognise the identification information and having an emulation layer configured to decapsulate the received packet, and detect any fault indication and output the CPRI frames.

14. The apparatus of claim 10, wherein the emulation layer comprises a pseudo wire layer.

15. The apparatus of claim 10, wherein the packet switched network comprises an ethernet network.

16. The apparatus of claim 10, wherein the number of CPRI frames encapsulated in each packet is greater than one.

17. A non-transitory computer-readable storage medium having computer code stored therein, which when executed by a processor of an apparatus for use as an endpoint of a Common Public Radio Interface (CPRI) link for sending CPRI frames to another endpoint of the CPRI link, cause the apparatus to perform operations comprising:
   running a protocol stack for sending the CPRI frames, the protocol stack comprising a CPRI layer and an emulation layer to emulate a point to point link, to enable the emulated point to point link to use a packet switched network, the CPRI layer configured to form the CPRI frames, and the emulation layer configured to select a number of CPRI frames to encapsulate in a packet by: determining a CPRI line rate associated with the CPRI link; determining, based on the determined CPRI line rate associated with the CPRI link, a length of the CPRI frames; and selecting, based on the determined length of the CPRI frames, the number of CPRI frames to ensure the CPRI link stays within CPRI delay limits, and to encapsulate a number of the CPRI frames in a packet with overhead suitable for indicating faults;
   the protocol stack further comprising a multiplexing layer configured to supplement the packet with identification information to associate the packet with the emulated point to point link; and sending the packets over a packet network to another endpoint of the CPRI link.

\* \* \* \* \*